US012327446B2

(12) United States Patent
Romano et al.

(10) Patent No.: US 12,327,446 B2
(45) Date of Patent: Jun. 10, 2025

(54) REFUSE CONTAINER IDENTIFICATION USING PARCEL DATA

(71) Applicant: The Heil Co., Chattanooga, TN (US)

(72) Inventors: Anthony Romano, Havertown, PA (US); Michael Dean Geary, Toronto (CA)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 18/771,516

(22) Filed: Jul. 12, 2024

(65) Prior Publication Data
US 2024/0404333 A1 Dec. 5, 2024

Related U.S. Application Data

(63) Continuation of application No. 18/472,621, filed on Sep. 22, 2023, now Pat. No. 12,073,669, which is a
(Continued)

(51) Int. Cl.
*G01C 21/36* (2006.01)
*B60P 1/34* (2006.01)
(Continued)

(52) U.S. Cl.
CPC ............ *G07C 5/085* (2013.01); *B60P 1/34* (2013.01); *B65F 3/04* (2013.01); *G01C 21/3667* (2013.01);
(Continued)

(58) Field of Classification Search
CPC ... G07C 5/085; B60P 1/34; B65F 3/04; B65F 2003/023; B65F 2003/0279;
(Continued)

(56) References Cited

U.S. PATENT DOCUMENTS 4,260,316 A    4/1981 Gollnick
4,714,122 A    12/1987 Appleton et al.
(Continued)

FOREIGN PATENT DOCUMENTS

CA    2918411    9/2016
EP    3483092    5/2019
(Continued)

OTHER PUBLICATIONS

CA Office Action issued in Canadian Application No. 2,969,939, dated Jul. 19, 2019, 3 pages.
(Continued)

*Primary Examiner* — Mathew Franklin Gordon
(74) *Attorney, Agent, or Firm* — Fish & Richardson P.C.

(57) ABSTRACT

Techniques are described for correlating entity identification information with refuse containers being serviced by a refuse collection vehicle (RCV). Location data can be collected by location sensor(s) on the RCV at a time when a triggering condition is present, such as a time when a lift arm is operating to empty a refuse container into the hopper of the RCV. The location data can be provided as input to an algorithm that estimates a container location through a vector offset to account for the distance and direction of the RCV lift arm relative to the location sensor in the RCV. The container location can be correlated with parcel data to determine the parcel that the container was on or near to when it was serviced, and the customer or other entity associated with the parcel can be correlated to the particular container based on the analysis.

20 Claims, 7 Drawing Sheets

Related U.S. Application Data continuation of application No. 18/168,186, filed on Feb. 13, 2023, now Pat. No. 11,816,940, which is a continuation of application No. 17/553,167, filed on Dec. 16, 2021, now Pat. No. 11,580,799, which is a continuation of application No. 16/446,200, filed on Jun. 19, 2019, now Pat. No. 11,222,491.

(60) Provisional application No. 62/687,075, filed on Jun. 19, 2018.

(51) Int. Cl.
    *B65F 3/04*     (2006.01)
    *G01S 19/42*     (2010.01)
    *G07C 5/08*     (2006.01)
    *B65F 3/02*     (2006.01)

(52) U.S. Cl.
CPC .......... *G01C 21/3697* (2013.01); *G01S 19/42* (2013.01); *B65F 2003/023* (2013.01); *B65F 2003/0279* (2013.01); *B65F 2210/168* (2013.01)

(58) Field of Classification Search
CPC .......... B65F 2210/168; G01C 21/3667; G01C 21/3697; G01S 19/42
See application file for complete search history.

(56) References Cited

U.S. PATENT DOCUMENTS

| | | | |
|---|---|---|---|
| 4,854,406 | A | 8/1989 | Appleton et al. |
| 5,062,759 | A | 11/1991 | Pieperhoff |
| 5,636,122 | A | 6/1997 | Shah et al. |
| 5,837,945 | A | 11/1998 | Cornwell et al. |
| 5,890,865 | A | 4/1999 | Smith et al. |
| 8,092,141 | B2 | 1/2012 | Curotto et al. |
| 9,403,278 | B1 | 8/2016 | Van Kampen et al. |
| 9,884,585 | B1 | 2/2018 | Lubbers |
| 10,633,180 | B2 | 4/2020 | Salinas et al. |
| 10,692,220 | B2 | 6/2020 | Gao et al. |
| 10,706,587 | B1 | 7/2020 | Sorgi et al. |
| 10,721,375 | B1 | 7/2020 | Boyd et al. |
| 11,010,903 | B1 | 5/2021 | Gallaudet et al. |
| 11,144,066 | B1 | 10/2021 | Ebrahimi Afrouzi |
| 11,222,491 | B2 | 1/2022 | Romano et al. |
| 11,580,799 | B2 | 2/2023 | Romano et al. |
| 11,615,275 | B2 | 3/2023 | Swaroop et al. |
| 11,816,940 | B2 | 11/2023 | Romano et al. |
| 12,080,040 | B2 | 9/2024 | Swaroop et al. |
| 2002/0159870 | A1 | 10/2002 | Pruteanu et al. |
| 2003/0031543 | A1 | 2/2003 | Elbrink |
| 2009/0092284 | A1 | 4/2009 | Breed et al. |
| 2009/0306863 | A1 | 12/2009 | Curotto et al. |
| 2011/0036738 | A1 | 2/2011 | Hiltl |
| 2011/0068954 | A1 | 3/2011 | McQuade et al. |
| 2011/0116899 | A1 | 5/2011 | Dickens |
| 2011/0188976 | A1 | 8/2011 | Rowland et al. |
| 2011/0190942 | A1 | 8/2011 | Nicholson et al. |
| 2011/0210124 | A1 | 9/2011 | Da Silva et al. |
| 2013/0039728 | A1 | 2/2013 | Price et al. |
| 2013/0083330 | A1 | 4/2013 | Piana et al. |
| 2013/0215270 | A1 | 8/2013 | Murashita et al. |
| 2013/0251485 | A1 | 9/2013 | Howell et al. |
| 2013/0260448 | A1 | 10/2013 | Wilson et al. |
| 2013/0313419 | A1 | 11/2013 | Nakazawa et al. |
| 2014/0239059 | A1 | 8/2014 | Flood et al. |
| 2014/0270495 | A1 | 9/2014 | Tu et al. |
| 2014/0343801 | A1 | 11/2014 | Whitfield, Jr. et al. |
| 2014/0379588 | A1 | 12/2014 | Gates et al. |
| 2015/0139536 | A1 | 5/2015 | Jin et al. |
| 2015/0348252 | A1 | 12/2015 | Mask |
| 2016/0232719 | A1 | 8/2016 | Brinig et al. |
| 2017/0237949 | A1 | 8/2017 | Wang et al. |
| 2017/0293800 | A1 | 10/2017 | Babenko et al. |
| 2017/0332199 | A1 | 11/2017 | Elliott et al. |
| 2017/0345169 | A1 | 11/2017 | Rodoni |
| 2017/0355522 | A1 | 12/2017 | Salinas et al. |
| 2017/0362030 | A1 | 12/2017 | Steimel |
| 2018/0044109 | A1 | 2/2018 | Butcher et al. |
| 2019/0087790 | A1 | 3/2019 | Flood |
| 2019/0159162 | A1 | 5/2019 | Hassan |
| 2019/0210798 | A1 | 7/2019 | Schultz |
| 2019/0325220 | A1 | 10/2019 | Wildgrube et al. |
| 2019/0385384 | A1 | 12/2019 | Romano et al. |
| 2020/0034785 | A1 | 1/2020 | Romano et al. |
| 2020/0082167 | A1 | 3/2020 | Shalom et al. |
| 2020/0193620 | A1 | 6/2020 | Armstrong et al. |
| 2021/0078799 | A1 | 3/2021 | Salinas et al. |
| 2021/0158308 | A1 | 5/2021 | Armstrong et al. |
| 2021/0326658 | A1 | 10/2021 | Swaroop et al. |
| 2021/0354911 | A1 | 11/2021 | Yhap et al. |
| 2022/0139126 | A1 | 5/2022 | Romano et al. |
| 2022/0229183 | A1 | 7/2022 | Chang |
| 2023/0230340 | A1 | 7/2023 | Swaroop et al. |
| 2023/0267784 | A1 | 8/2023 | Romano et al. |
| 2024/0087381 | A1 | 3/2024 | Romano et al. |

FOREIGN PATENT DOCUMENTS

| | | |
|---|---|---|
| KR | 10-2017-0109273 | 9/2017 |
| WO | WO 2017176855 | 10/2017 |
| WO | WO 2018189668 | 10/2018 |

OTHER PUBLICATIONS

CA Office Action issued in Canadian Application No. 2,969,939, dated Oct. 4, 2018, 4 pages.

Extended European Search Report in European Appln No. 21793530.3, mailed on Jul. 3, 2024, 10 pages.

Extended European Search Report in European Appln. No. 19840950.0, dated Sep. 10, 2021, 11 pages.

International Search Report and Written Opinion in International Appln. No. PCT/US2019/043771, dated Nov. 12, 2019, 10 pages.

International Search Report and Written Opinion in International Appln. No. PCT/US2021/022761, dated Jul. 9, 2021, 7 pages.

Liu et al., "Deep Learning Model Comparison for Vision-Based Classification of Full/Empty-Load Trucks in Earthmoving Operations," Applied Sciences, Nov. 2019, 9(22):1-20.

Pace, "Life Cycle Assessment Based Modeling of Organic Waste Residue Using Anaerobic Digestion and Composting," Dissertation for the degree of Doctor of Philosophy in Biological Systems Engineering, University of California, Jul. 2017, 133 pages.

Pekdur, "Autonomous Solid Waste Separation System Design," Thesis for the degree of Master of Science in Mechanical Engineering, Izmir Institute of Technology, Graduate School of Engineering and Sciences, Jun. 2006, 85 pages.

Rose et al., "A comparative life cycle assessment of diesel and compressed natural gas powered refuse collection vehicles in a Canadian city," Energy Policy, 2013, 52:453-461.

Sudha et al., "An Automatic Classification Method for Environment-Friendly Waste Segregation Using Deep Learning," 2016 IEEE International Conference on Technological Innovations in ICT for Agriculture and Rural Development, 2016, 6 pages.

REFUSE CONTAINER IDENTIFICATION USING PARCEL DATA

CROSS-REFERENCE TO RELATED APPLICATIONS

This application is a continuation of U.S. patent application Ser. No. 18/472,621, entitled "Refuse Container Identification Using Parcel Data," filed on Sep. 22, 2023, which is a continuation of U.S. patent application Ser. No. 18/168,186, entitled "Refuse Container Identification Using Parcel Data," filed on Feb. 13, 2023, now U.S. Pat. No. 11,816,940, which is a continuation of U.S. patent application Ser. No. 17/553,167, entitled "Refuse Container Identification Using Parcel Data," filed on Dec. 16, 2021, now U.S. Pat. No. 11,580,799, which is a continuation of U.S. patent application Ser. No. 16/446,200, entitled "Refuse Container Identification Using Parcel Data," filed on Jun. 19, 2019, now U.S. Pat. No. 11,222,491, which claims the benefit under 35 U.S.C. § 119 (e) of U.S. Patent Application No. 62/687,075, entitled "Refuse Container Identification Using Parcel Data," filed on Jun. 19, 2018, which are incorporated herein by reference in their entirety.

BACKGROUND

A refuse collection company may operate a fleet of refuse collection vehicles (RCVs) that operate regularly to collect refuse from the containers of various customers and transport the refuse to a processing site. Using traditional methods, it can be difficult to determine which container(s) are associated with particular customer(s) of the refuse collection company, particularly in dense urban areas in which the placement of containers to be emptied can be inconsistent, and in which containers for different customers can be located near one another.

SUMMARY

Implementations of the present disclosure are generally directed to determining a particular individual or entity (e.g., customer) associated with a particular refuse container that is emptied by a refuse collection vehicle (RCV). More particularly, implementations of the present disclosure are directed to determining a location of a container to be emptied, based on location information for the RCV and/or information regarding the configuration of the RCV, the location information correlated with parcel data describing land parcels in the region of the RCV.

In general aspect, a method includes receiving sensor data indicating an operational state of at least one body component of a refuse collection vehicle (RCV), the sensor data generated by at least one body sensor device that is arranged to determine the operational state of the at least one body component; analyzing the sensor data to detect a presence of at least one triggering condition that is based at least partly on a particular operational state of the at least one body component, as indicated by the sensor data, the at least one triggering condition indicating that the RCV is servicing a container; receiving location data describing a location of a location sensor of the RCV; applying an algorithm to the location data to determine a location of the container; and correlating the location of the container to parcel data to identify an entity associated with the container.

Implementations of the general aspect may each optionally include one or more of the following features.

The triggering condition may include a lifting component of the RCV being at a particular position in a lift cycle.

The triggering condition may include a top lid of a hopper of the RCV being opened.

The triggering condition may include a grabber of the RCV being in a particular position.

The triggering condition may be further based on the RCV moving at a speed less than a threshold speed.

In some cases, the location sensor is a receiver configured to receive signals from a global positioning system (GPS) and the location data comprises GPS coordinates corresponding to the location of the location sensor.

In some cases, applying, by the at least one processor, an algorithm to the location data to determine a location of the container includes offsetting the GPS coordinates corresponding to the location of the location sensor by a predetermined amount.

Applying, by the at least one processor, an algorithm to the location data to determine a location of the container may include offsetting the GPS coordinates corresponding to the location of the location sensor by a first amount in a first direction and by a second amount in a second direction, and the second direction is perpendicular to the first direction.

In some cases, the first direction corresponds to a direction along a long axis of the RCV.

In some cases, the first amount is less than the second amount.

In some cases, the first amount and the second amount are specific to a configuration of the RCV.

The method may further include transmitting the parcel data for a particular parcel correlated with the location of the container to at least one output device for presentation of the parcel data on the at least one output device.

In some cases, the method further includes storing the correlation between the location of the container and the parcel data in a storage device communicably coupled to the at least one processor.

The method may further include generating a billing record based at least in part on the correlation between the location of the container and the parcel data.

In some cases, the method further includes transmitting, to the entity associated with the container, a notification indicating that the container has been serviced.

The method may further include displaying information related to the entity associated with container on a display of the RCV.

In some cases, the method further includes determining one or more performance metrics related to a driver or a route associated with the RCV based at least in part on the correlation between the location of the container and the parcel data.

In another general aspect, a system includes a refuse collection vehicle (RCV) and at least one processor. The RCV includes a lift arm that is operable to empty a container into a hopper of the RCV, at least one body sensor device that is arranged to collect sensor data indicating an operational state of at least one body component of the RCV, and at least one location sensor that is arranged to collect location data indicating the location of the at least one location sensor. The at least one processor is communicably coupled to the at least one body sensor device and the at least one location sensor. The at least one processor is configured to perform operations including receiving sensor data indicating an operational state of at least one body component of a refuse collection vehicle (RCV), the sensor data generated by the at least one body sensor device; analyzing the sensor data to detect a presence of at least one triggering condition that is based at least partly on a particular operational state of the at least one body component, as indicated by the sensor data, the at least one triggering condition indicating that the RCV is servicing a container; receiving location data describing a location of the location sensor of the RCV; applying an algorithm to the location data to determine a location of the container; and correlating the location of the container to parcel data to identify an entity associated with the container.

In an aspect combinable with the general aspect, the at least one body sensor device is arranged to detect the operational state of the lift arm, and the triggering condition includes the lift arm being at a particular position in a lift cycle.

In another general aspect, a refuse collection vehicle (RCV) includes a lift arm that is operable to empty a container into a hopper of the RCV; at least one body sensor device that is arranged to collect sensor data indicating an operational state of at least one body component of the RCV; at least one location sensor that is arranged to collect location data indicating the location of the at least one location sensor; and an onboard computing device. The onboard computing device is communicably coupled to the at least one body sensor device and the at least one location sensor. The onboard computing device is configured to perform operations that include receiving, from the at least one body sensor device, sensor data indicating an operational state of at least one body component of the RCV; analyzing the sensor data to detect a presence of at least one triggering condition that is based at least partly on a particular operational state of the at least one body component, as indicated by the sensor data, the at least one triggering condition indicating that the RCV is servicing a container; receiving, from the at least one location sensor, location data describing the location of the at least one location sensor; applying an algorithm to the location data to determine a location of the container; and correlating the location of the container to parcel data to identify an entity associated with the container.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1A:
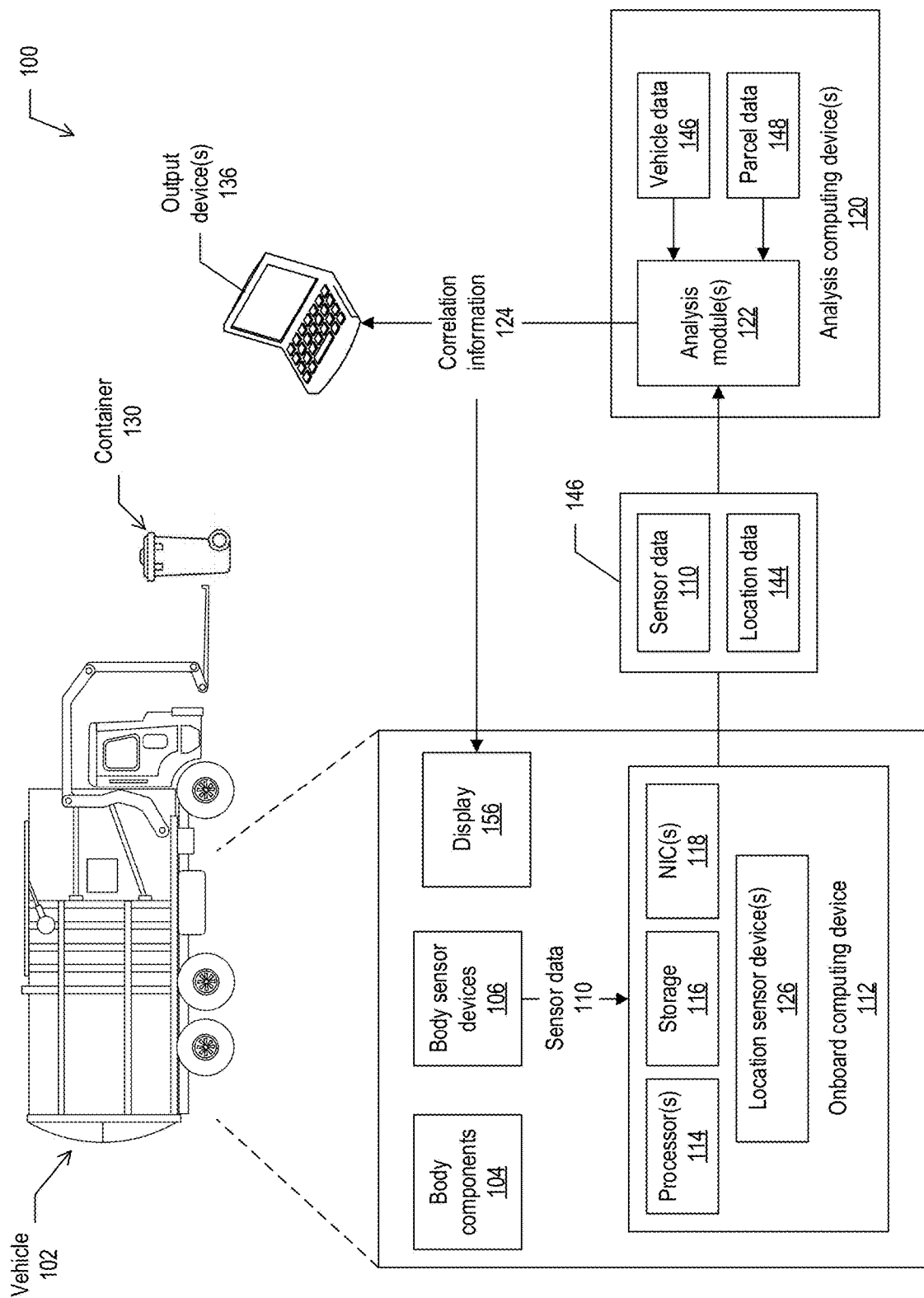
FIG. 1A depicts an example system for container identification, according to implementations of the present disclosure.

Implementations of the present disclosure are directed to systems, devices, methods, and computer-readable media for determining an association between a refuse container and a customer (e.g., an individual, business, or other entity). The association of customer to container can be determined based on sensor data and/or location data generated by sensor device(s), and/or other device(s) onboard a refuse collection vehicle (RCV), in combination with information regarding the RCV's configuration (e.g., whether it is a side loader trucker, front loader truck, etc.) and parcel data describing the geographic coordinates, boundaries, and/or shape of land parcels in the vicinity of the RCV.

In some implementations, sensor devices are located at various positions on the RCV, and arranged to generate sensor data that indicates a current operational state of one or more body components of the RCV. As used herein, a body component describes a component of the RCV that is not directly involved in causing the translational movement of the RCV from one location to another. For example, a body component can be a lifting component (e.g., lift arm) that operates to lift a refuse container and/or empty the refuse held by the refuse container into a hopper of the RCV. Other types of body components are described below. The sensor data can be analyzed to determine the presence of a triggering condition that is based at least partly on the state or position of at least one body component, such as the lifting component being at a particular position in its cycle to lift and empty a refuse container into the hopper of the RCV. Triggering conditions can also be based on other factors, such as the speed, deceleration, and/or location of the RCV.

Based on a time when the triggering condition is present, such as a time when a lift arm of the RCV is lifting a container to empty it into a hopper or other area of the RCV, a determination is made of the geographic coordinates of a location sensor that is in or on the RCV. For example, the location sensor can be a receiver configured to receive signals from the global positioning system (GPS) and determine the location (e.g., latitude and longitude) of the sensor based on the received signals. The sensor coordinates can be used to determine the coordinates where the container was placed prior to being emptied, based on configuration information regarding the RCV. For example, the RCV configuration information can indicate that the lift arm of the RCV is located at a particular distance and direction from the location sensor, such that the coordinates of the container can be determined by adding the coordinates of the location sensor to a vector that is the distance and direction of the location sensor from the lift arm. The container coordinates can be correlated with land parcel data describing the geographic coordinates, boundaries, and/or shapes of the various parcels in the area (e.g., the city) where the RCV is operating. The parcel data can be publicly available data that describe the parcels as the divisions of the land, in a city, county, or other area, for tracking land ownership or other purposes. The parcel data can identify entities (e.g., individuals or companies) that own or otherwise occupy the parcel(s). By finding the particular parcel that is closest to the coordinates of the container being emptied by the RCV, and by determine the entity associated with the closest particular parcel (e.g., the entity who owns or leases the parcel), implementations can determine that the container is associated with entity that is associated with the closest parcel to the container when it is emptied.

Implementations described herein can passively (e.g., without explicit human input or activity) identify the residential refuse collection service customer and associate the customer's parcel information to residential service events provided by a RCV without any driver interaction. RCVs generally remain in the street while servicing (e.g., residential) locations, making it difficult to passively associate the service being provided to an exact address and/or customer. GPS data can be utilized to provide a visual representation of the direction and path of a RCV. However, in many instances the GPS data is not able to distinguish where the actual service was provided by the RCV relative to a no-service driving path. Although reverse geocoding, the automated process of associating an address with a set of coordinates, can be helpful, it can also be highly inaccurate. Adding complexity to the problem, GPS alone cannot be used to accurately determine which side of the street the RCV is servicing. In addition, GPS location sensors (e.g., antennas) can be located in the cab of the RCV, or at some other position in or on the RCV, at some distance from the actual RCV service event at the collection arm that empties the container.

By incorporating a specific signal from the RCV which provides definitive time stamp and coordinates of actual service events, it is possible to differentiate service events from other GPS paths. To correlate this service event with the correct address and/or customer, implementations described herein employ a series of geospatial algorithms to associate the coordinates of the event to the fixed (e.g., residential) parcel shape indicated in the parcel data. In some implementations, a processing software module receives the latitude and longitude coordinates of the service events and extends the distance (e.g., by 50 feet) to account for the distance between the location sensor and the lifting arm. The algorithm can also pivot at the point of the original position 90 degrees to the right, for example in instances where the RCV is a side-loader truck providing right side service, and adds 10 feet in the direct opposite direction of the current RCV heading. These adjustments are made based on the configuration of the particular vehicle, and may vary from vehicle to vehicle. This process correlates the RCV service event to the actual parcel being serviced, and thus correlates the container being serviced with an entity (e.g., individual or business) that is the owner, lessor, and/or occupant of the parcel. Implementations can associate the parcel and customer attributes from the parcel or closest parcel to the service event. In some implementations, the correlation data generated by this process can be used for billing purposes, such as invoicing. In some examples, the correlation data generated by this process is used to provide service verification to the refuse collection service and/or customers of the refuse collection service.

Figure 1B:
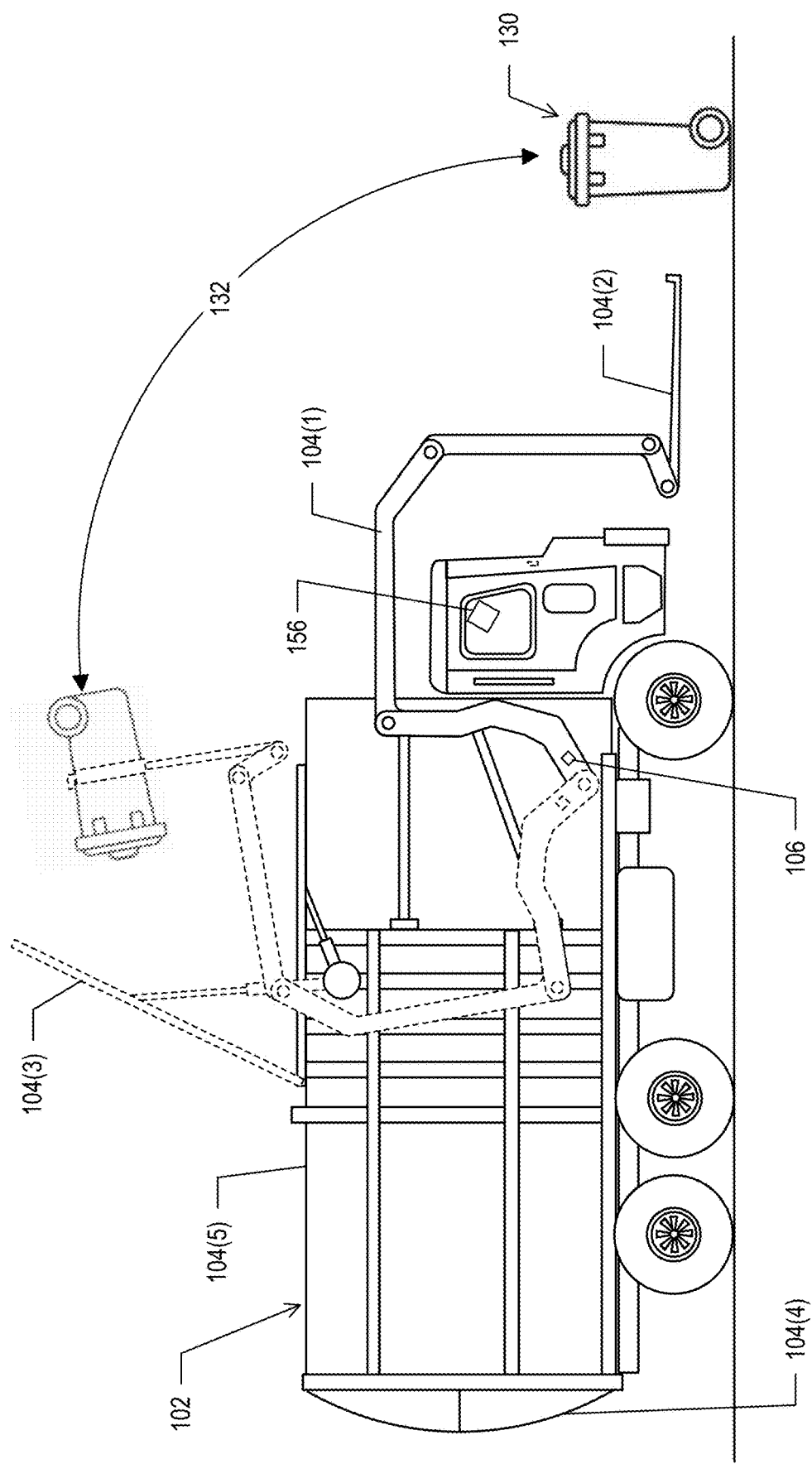
FIG. 1B depicts an example schematic of a refuse collection vehicle, according to implementations of the present disclosure.

FIG. 1A depicts an example system, according to implementations of the present disclosure. As shown in the example of FIG. 1A, a RCV 102 can include any suitable number of body components 104. The RCV 102 can be any suitable type of vehicle that operates to collect and transport refuse. As used herein, the term "refuse" encompasses, but is not limited to, garbage, recyclable materials, and waste materials. The RCV can also be described as a garbage collection vehicle, a recycling collection vehicle, a recycling truck, or a garbage truck. The RCV 102 can be configured to lift containers 130 that contain refuse, and empty the refuse in the containers into a hopper or other refuse holding portion of the RCV, to enable transport of the refuse to a collection site, compacting of the refuse, and/or other refuse handling activities. The RCV 102 can also handle containers in other ways, such as by transporting the containers to another site for emptying. Although FIGS. 1A and 1B depict a container configured for collecting refuse from residential customers, implementations can be applied to refuse collection from residential customers, commercial customers, and/or collection in other appropriate scenarios.

The body components 104 can include various components that are appropriate for the particular type of RCV 102. For example, the RCV may be a truck with an automated side loader (ASL). Alternatively, the RCV may be a front loading truck, a rear loading truck, a roll off truck, or some other type of RCV. A RCV with an ASL may include body components involved in the operation of the ASL, such as arms and/or a fork, as well as other body components such as a pump, a tailgate, a packer, and so forth. A front loading RCV, such as the example shown in FIGS. 1A and 1B, may include body components such as a pump, tailgate, packer, grabber, and so forth. A rear loading RCV may include body components such as a pump, blade, tipper, and so forth. A roll off RCV may include body components such as a pump, hoist, cable, and so forth. Body components may also include other types of components that operate to bring garbage into a hopper (or other storage area) of a truck, compress and/or arrange the garbage in the hopper, and/or expel the garbage from the hopper.

The RCV 102 can include any number of body sensor devices 106 that sense body component(s), and generate sensor data 110 describing the operation(s) and/or the operational state of various body components 104. The body sensor devices 106 are also referred to as sensor devices, or sensors. Sensors may be arranged in the body components 104, or in proximity to the body components 104, to monitor the operations of the body components 104. The sensors may emit signals that include the sensor data 110 describing the body component operations, and the signals may vary appropriately based on the particular body component being monitored. In some implementations, the sensor data 110 is analyzed, by a computing device on the RCV and/or by remote computing device(s) (e.g., analysis computing device(s) 120), to identify the presence of a triggering condition based at least partly on the operational state of one or more body components, as described further below.

In some implementations, the sensor data may be communicated from the sensors to an onboard computing device 112 in the RCV 102. In some instances, the onboard computing device is an under-dash device (UDU), and may also be referred to as the Gateway. Alternatively, the device 112 may be placed in some other suitable location in or on the RCV. The sensor data may be communicated from the sensors to the onboard computing device 112, over a wired connection (e.g., an internal bus) and/or over a wireless connection. In some implementations, a J1939 bus connects the various sensors with the onboard computing device 112. In some implementations, the sensors may be incorporated into the various body components. Alternatively, the sensors may be separate from the body components. In some implementations, the sensors may digitize the signals that communicate the sensor data, before sending the signals to the onboard computing device, if the signals are not already in a digital format.

The onboard computing device 112 can include one or more processors 114 that provide computing capacity, data storage 116 of any suitable size and format, and network interface controller(s) 118 that facilitate communication of the device 112 with other device(s) over one or more wired or wireless networks.

In some implementations, the analysis of the sensor data 110 is performed at least partly by the onboard computing device 112, e.g., by processes that execute on the processor(s) 114. For example, the onboard computing device 112 may execute processes that perform an analysis of the sensor data 110 to detect the presence of a triggering condition, such as a lift arm being in a particular position in its lift cycle to empty a container into the hopper of the RCV.

On detecting the triggering condition, the device 112 can transmit one or more signals 146 to analysis computing device(s) 120 over one or more networks. Such signal(s) 146 can include location data 144 describing a location of the vehicle 102, the onboard computing device 112, and/or the container 130 at a time when the triggering condition is present. In some implementations, the signal(s) 146 indicate the presence of the triggering condition and include the location data 144. In some implementations, the signal(s) 146 can also include at least a portion of the sensor data 110. One or more analysis modules 122 executing on the analysis computing device(s) 120 can analyze the information included in the signal(s) 146 to determine an entity associated with the container 130 being emptied, as described further below.

In some examples, the location data 144 is determined through a satellite-based navigation system such as the global positioning system (GPS), or through other techniques. In such instances, the onboard computing device 112 can include location sensor device(s) 126, such as GPS receivers or other types of sensors that enable location determination. The location sensor(s) 126 can generate location data 144 that describes a current location of the onboard computing device 112 at one or more times. The location data 144 can be used, in conjunction with vehicle data 146 and/or parcel data 148, to determine an entity associated with the container, such as a customer of the refuse collection service who uses the container 130 to dispose of refuse. In some implementations, the analysis of the signal(s) 146, on the device 112, the analysis device(s) 120, or elsewhere, may be performed in real time with respect to the triggering condition and/or with respect to the generation of the sensor data and/or location data. Alternatively, the analysis can be performed periodically (e.g., in a batch analysis process), such as once a day and/or at the end of a particular RCV's refuse collection route.

In the example of FIG. 1A, the signal(s) 146 including the location data 144 and/or sensor data 110 are sent to the analysis computing device(s) 120, and analysis module(s) 122 executing on the device(s) 120 analyze the data to determine an entity associated with the container 130 that is emptied. Such analysis can include determining whether a triggering condition is present. If a triggering condition is present, the location data 144 can be analyzed, along with vehicle data 146 and/or parcel data 148, to identify a customer associated with the container. Correlation information 124 describing one or more customers who have been identified as being associated with one or more containers 130 can be communicated to output device(s) 136 and presented on the output device(s) 136. In some implementations, the correlation information 124 is stored in memory device communicably coupled to one or more of the onboard computing device 112, the analysis computing device 120, and the output computing device 136.

In some implementations, the correlation information 124 is used for billing activities, such as generating and submitting invoices to customers of the refuse collection service. For example, upon identifying an entity associated with a container 130 based on the correlation between the container location 144 and parcel data 148 using the methods described herein, the information for the entity associated with the container 130 (e.g., entity name, entity mailing address, entity billing address, etc.) can be added to a database used by the refuse collection service to produce billing invoices. In some implementations receiving sensor data 110 indicating that a container 130 correlated with a particular entity, as determined by correlation information 124, is being serviced, the service event may be automatically recorded in a billing record associated with the identified entity, such as an invoice for the identified entity.

In some implementations, the correlation information 124 is used to perform service verification. For example, the correlation information 124 may be used to determine whether a particular entity has received refuse collection services during a particular time period by determining whether a container 130 indicated in the correlation information 124 as being associated with the entity has been serviced during the time period. In some implementations, in response to receiving sensor data 110 indicating that a particular container 130 is being serviced, the correlation information 124 correlating the container 130 with an entity based on parcel data 148 can be used to generate a notification or record that the entity's container 130 has received service. In some implementations, in response to receiving sensor data 110 indicating that a particular container 130 is being serviced, an electronic notification, such as an SMS text message or an email message, indicating that the container 130 has been serviced is sent to a computing device of the entity associated with container 130, as determined by the correlation information 124. In some examples, in response to receiving sensor data 110 indicating that a particular container 130 is being serviced, a notification indicating that the container has been serviced is sent to the entity associated with container 130 based on the correlation information 124 through a mobile application accessible by the entity. In some implementations, in response to receiving sensor data 110 indicating that a particular container 130 is being serviced, the correlation information 124 associated with the container 130 is displayed on an electronic display 156 within the cab of the RCV 102. In some examples, in response to receiving sensor data 110 indicating that a particular container 130 is being serviced, the service event, including the correlation information 124 for the service event, is automatically recorded in a data tracking system of the refuse collection company. For example, details regarding the service event (e.g., the date and time of the service event) and information regarding the entity associated with the serviced container 130, as determined by correlating location data 144 and parcel data 148, may be stored in a the data tracking system of the refuse collection company for use in determining driver and/or route performance indicators.

A large amount of sensor data 110 can be generated by the sensors and received by the onboard computing device 112. In some implementations, a suitable data compression technique is employed to compress the sensor data 110, location data 144, and/or other information before it is communicated in the signal(s) 146, over network(s), to the remote device(s) 120 for further analysis. In some implementations, the compression is lossless, and no filtering is performed on the data that is generated and communicated to the onboard computing device and then communicated to the remote device(s). Accordingly, such implementations avoid the risk of losing possibly relevant data through filtering.

Sensors can be provided on the RCV body to evaluate cycles and/or other parameters of various body components. For example, the sensors can measure the hydraulic pressure of various hydraulic components, and/or pneumatic pressure of pneumatic components. The sensors can also detect and/or measure the particular position and/or operational state of body components such as the top door of the RCV, a Curotto Can® attached to the RCV, a lift arm, a refuse compression mechanism, a tailgate, and so forth, to detect events such as a lift arm cycle, a pack cycle, a tailgate open or close event, an eject event, tailgate locking event, and/or other body component operations. Various operations of body components, positions of body components, and/or states of body components can be designated as triggering conditions that trigger the capture, communication, and/or analysis of location data to determine customer(s) associated with container(s).

In some implementations, the RCV includes a body controller that manages and/or monitors various body components of the RCV. The body controller of the RCV can be connected to multiple sensors in the body of the RCV. The body controller can transmit one or more signals over the J1939 network, or other wiring on the RCV, when the body controller senses a state change from any of the sensors. These signals from the body controller can be received by the onboard computing device that is monitoring the J1939 network. In some implementations, the onboard computing device has a GPS chip or other location determination devices that logs the location of the RCV at each second or at other intervals. The onboard computing device can identify the body component signals (as distinguished from RCV signals) and transmit them, along with the location (e.g., GPS) data, to the remote computing device(s) 120, e.g., through a cellular connection, WiFi network, other wireless connection, or through a serial line, Ethernet cable, or other wired connection.

The sensor data 110 can be analyzed, on the device 112, device(s) 120, or elsewhere, to identify specific signals from the body controller that indicate that a container has been serviced or is being serviced. For example, the sensor data 110 can indicate that the forks are being moved, the grabber is being moved, the hopper lid is being opened, and so forth. Such body component operational states can be used as triggering conditions to trigger the communication and analysis of the location data for customer-to-container correlation.

In some implementations, the onboard computing device is a multi-purpose hardware platform. The device can include a UDU (Gateway) and/or a window unit (WU) (e.g., camera) to record video and/or audio operational activities of the RCV. The onboard computing device hardware subcomponents can include, but are not limited to, one or more of the following: a CPU, a memory or data storage unit, a CAN interface, a CAN chipset, NIC(s) such as an Ethernet port, USB port, serial port, I2c lines(s), and so forth, I/O ports, a wireless chipset, a GPS chipset, a real-time clock, a micro SD card, an audio-video encoder and decoder chipset, and/or external wiring for CAN and for I/O. The device can also include temperature sensors, battery and ignition voltage sensors, motion sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2c lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

The onboard computing device can determine the speed and/or location of the RCV using various techniques. CAN_SPEED can be determined using the CAN interface and using J1939 or J1962, reading wheel speed indicator. The wheel speed can be created by the RCV ECU. The RCV ECU can have hardware connected to a wheel axle and can measure rotation with a sensor. GPS_SPEED can provide data from GPS and be linked, such as to a minimum of three satellites and a fourth satellite to determine altitude or elevation. Actual coordinates of the RCV on the map can be plotted and/or verified, to determine the altitude of RCV. SENSOR_SPEED can be provided using motion sensors, such as accelerometer, gyroscope, and so forth. These hardware component may sample at high frequency and may be used to measure delta, rate of acceleration, and derive speed from the measurements. Other speed sensors can also be used. LOCATION_WITH_NO_GPS can be provided using the GPS chipset with dead reckoning, and can derive actual RCV location and movement by using a combination of SENSOR_SPEED and CAN_SPEED. Even if GPS is not available, some systems can determine accurately where the RCV is based on such dead reckoning.

FIG. 1B depicts an example schematic of an example RCV 102, according to implementations of the present disclosure. As shown in the example of FIG. 1B, the RCV 102 can include any suitable number and type of body components 104 according to the design and/or purpose of the RCV 102. For example, the RCV 102 can include body components 104 including, but not limited to: a lift arm 104(1), a grabber mechanism 104(2), a top lid or hopper lid 104(3), a back gate or tailgate 104(4), and a hopper 104(5) to hold refuse during its transport. One or more body sensors 106 can be situated to determine the state and/or detect the operations of the body components 104. In the example shown, the lift arm 104(1) includes a body sensor 106 that is arranged to detect the position of the arm 104(1), such as during its cycle 132 to lift a container 130 and empty it into the hopper 104(5).

The sensor data can be analyzed to determine the triggering condition that indicates a container is being serviced, was serviced, or is about to be serviced. Based on the triggering condition, the location data can be analyzed to determine a customer associated with the container being emptied. For example, a triggering condition can be a particular point in the cycle of the lift arm to lift a container and empty it into the hopper. As another example, a triggering condition can be a cycle of the top lid (e.g., lid to the hopper) that indicates the top lid is being opened to empty a container into the hopper. As another example, a triggering condition can be a cycle of the grabber to grab a container for emptying into the hopper.

In some implementations, the determination of a triggering condition can be further based on the movement of the RCV. For example, a triggering condition can be determined based on the RCV moving at less than a threshold speed (or decelerating to below a threshold speed) prior to the sensor data indicating a particular operational state of body components. Velocity and/or acceleration (or deceleration) of the RCV can be based at least partly on information received from the RCV's onboard systems, such as a GPS receiver and/or telematics sensor(s) describing the current speed, orientation, and/or location of the RCV at one or more times.

In some implementations, the data to be uploaded to the device(s) 120 can be packaged, in the signal(s) 146, into bundles of (e.g., telemetry) data every 5-10 minutes. This bundle of data can be compressed and/or encrypted, and transmitted to the remote device(s) over a suitable network, such as a wireless cell network. In some implementations, the uploaded data includes the relevant data for one or more particular container handling events. For example, the sensor data can be analyzed on the device 112 to determine the presence of a triggering condition, and the particular location data at the time of the triggering condition can be uploaded for analysis along with the corresponding time period of telemetry data and/or sensor data. In some instances, the data can be uploaded in real time with respect to the handling of the container, or the data can be uploaded in batches periodically. Data upload may be delayed until a suitable network connection is available between the onboard computing device 112 and the remote device(s) 120.

In some implementations, at least a portion of the analysis that is described herein as being performed on the analysis computing device(s) 120 can be performed by the onboard computing device 112 instead of or in addition to being performed on the analysis computing device(s) 120 and/or the output device(s) 136.

As used herein, a real time process or operation describes a process or operation that is performed in response to detecting a triggering condition (e.g., event), in which the real time process is performed without any unnecessary delay following the triggering condition, apart from the delay that is incurred due to the limitations (e.g., speed, bandwidth) of any networks being used, transfer of data between system components, memory access speed, processing speed, and/or computing resources. A real time process or operation may be performed within a short period of time following the detection of the triggering condition, and/or may be performed at least partly concurrently with the triggering condition. A triggering condition may be the receipt of a communication, the detection of a particular system state, and/or other types of events. In some instances, a real time process is performed within a same execution path, such as within a same process or thread, as the triggering condition. In some instances, a real time process is performed by a different process or thread that is created or requested by a process that detects the triggering condition. A real time process may also be described as synchronous with respect to the triggering condition.

As described herein, the triggering condition can be one or more of the following: a particular operational state of a body component (e.g., a position of the lift arm in its cycle), a velocity (e.g., speed and/or direction of travel) of the RCV, an acceleration or deceleration of the RCV, and/or other criteria. The presence of the triggering condition can cause the communication and/or analysis of the location data to correlate customer with container.

Figure 2A:
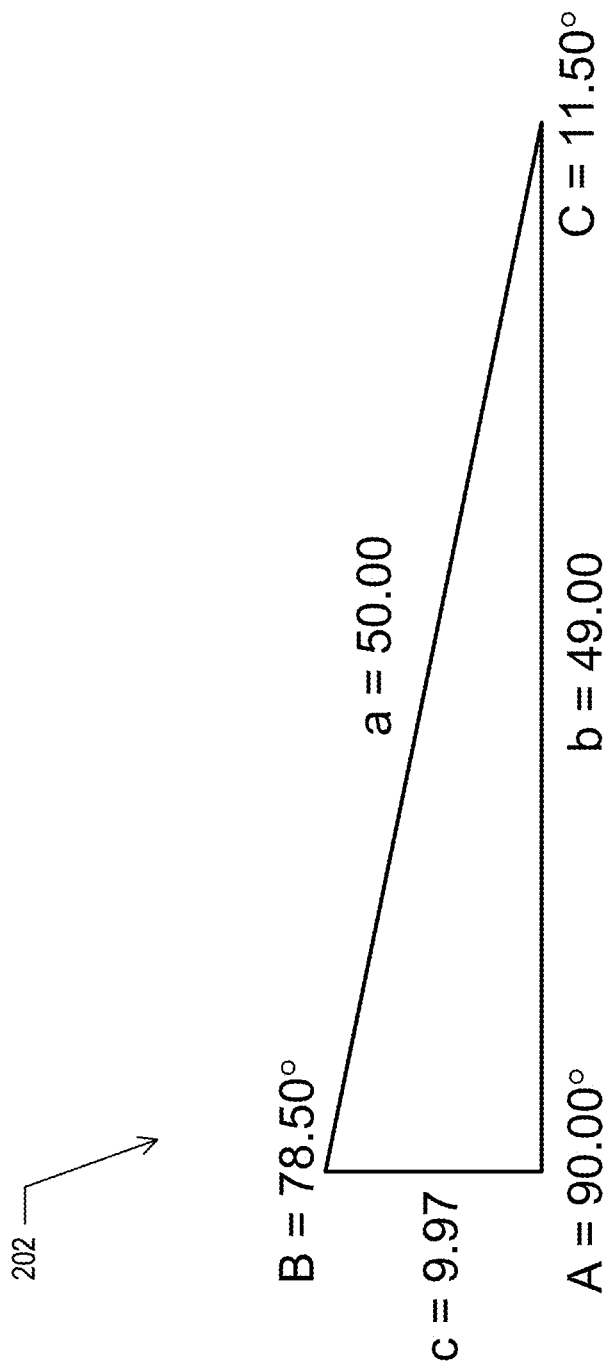
FIGS. 2A and 2B depict example schematics for a container identification process, according to implementations of the present disclosure.
Figure 2B:
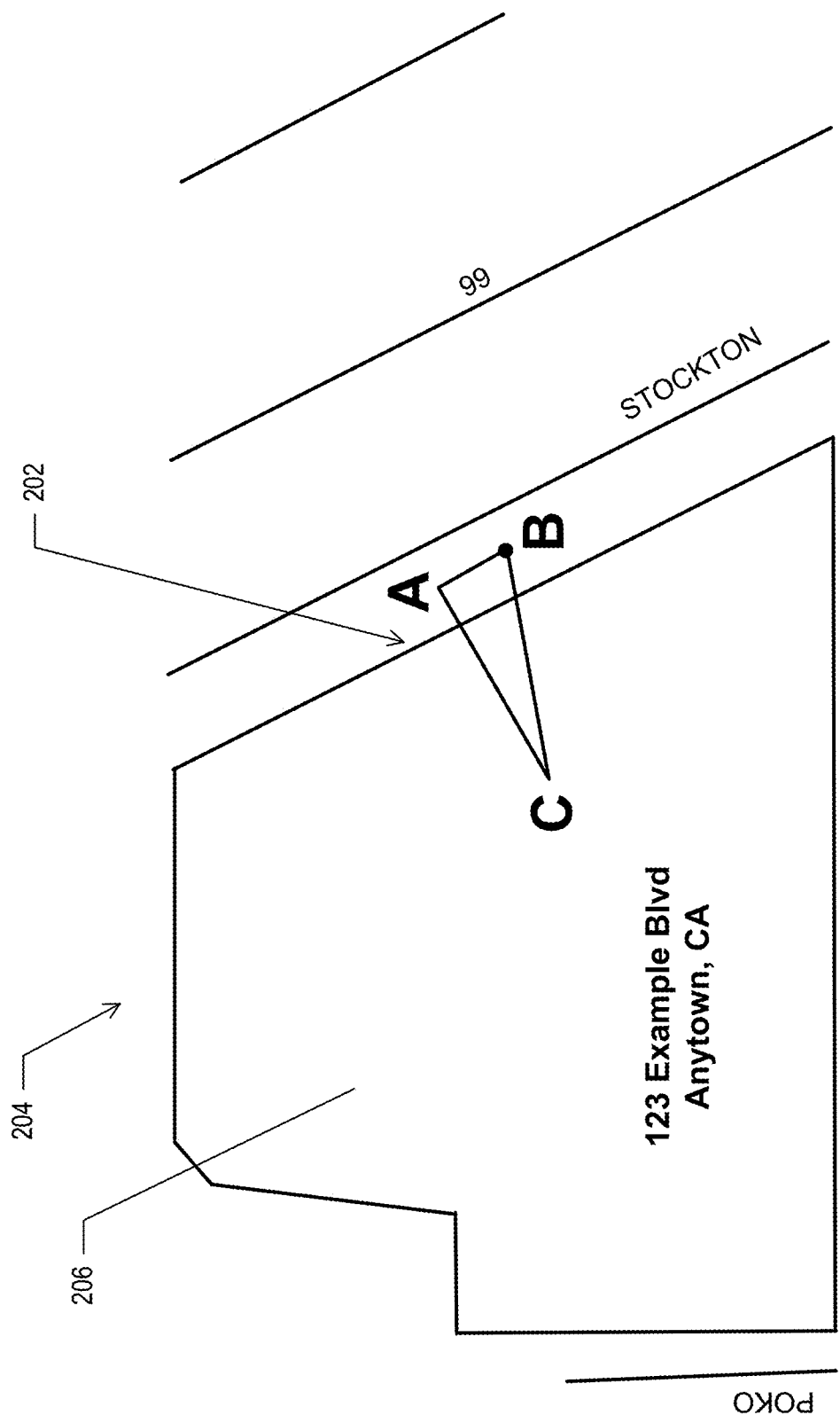

FIGS. 2A and 2B depict example schematics for a container identification process, according to implementations of the present disclosure. FIG. 2A illustrates an example algorithm that may be employed to determine the geographic coordinates of a refuse container where it is sitting out (e.g., in or near a street) to be emptied by the RCV. In FIG. 2A, a triangular offset calculation diagram 202 is shown, in which B is the location of the location sensor device in the RCV, A is a point that is offset from B by a particular distance along a first axis, and C is a point that is offset from A by a particular distance along a second axis. For example, if the RCV is a side loader truck, A can be determined as B offset by a distance c (e.g., approximately 10 feet) to account for a distance along the first axis (e.g., along the long axis of the truck) from the sensor device to the collection arm that lifts the container. C can be determined as A offset by a distance b (e.g., approximately 50 feet) to account for the distance along the second axis (e.g., perpendicular to the long axis of the truck) from the sensor device to the collection arm and/or to a portion of the parcel that corresponds to the container being serviced.

The distances c and b define a vector a that has a distance and direction, such that adding the vector a to the point B provides the point C that is an estimate of the location of the container being serviced. The particular length and direction of the vector a can vary based on the particular configuration of the RCV 102, as described in the vehicle data 146. For example, the offset vector a can be different for a side loader RCV versus a rear loader RCV or a front loader RCV.

FIG. 2B illustrates the algorithm as it may be applied with respect to an actual parcel where a container may be serviced. In the example diagram 204, the triangular shaped offset calculation diagram 202 is shown relative to a particular parcel 206.

The example shows the RCV heading southeast. The service signal is sent at point B. The algorithm adds 10 feet in the opposite heading (northwest) to determine point A and pivots 90 degrees and adds 50 feet to determine point C. The service event can be used to accurately associate the attributes and customer information of the parcel 206. Revised latitude and longitude (e.g., the estimated container coordinates) can be determined as in Example Formulae 1 and 2 below.

Example Formula 1

$$\text{Revised Latitude} = \text{ASIN}(\text{SIN}(\text{OriginalServiceEventLat} * \text{PI}()/180) * \text{COS}(50 \text{ FeetOffset}/20903520) + \text{COS}(\text{OriginalServiceEventLat} * \text{PI}()/180) * \text{SIN}(50 \text{ feetOffSet}/20903250) * \text{COS}(\text{RADIANS}(\text{Currentheading}))) * 180/\text{PI}()$$

| Example Formula 2 |
| --- |
| Revised Longitude = ((OriginalServiceEventLon * PI( )/180) + ATAN2 (COS (50 FeetOffset/ 20903520) − SIN (OriginalServiceEventLat * PI( )/180) * SIN (ASIN (SIN (OriginalServiceEventLat * PI( )/180) * COS (50 FeetOffset/20903520) + COS (OriginalServiceEventLat * PI( )/180) * SIN (50 FeetOffset/20903520) * COS (RADIANS (CurrentHeading)))), SIN (RADIANS (CurrentHeading)) * SIN (50 FeetOffset/20903520) * COS (OriginalServiceEventLat * PI( )/180))) * 180/PI( ) |

In the above examples, the latitude and longitude components correspond with the X, Y coordinates collected and stored by the GPS in the RCV during the actual service event. Implementations employ an algorithm to offset the GPS location by 10 feet based on the location of the arm, pivot 90 degrees based on heading of the truck, and add an additional 50 feet to place the event coordinates onto the parcel that was serviced by the RCV being in the street.

Previously available solutions for identifying the location of a residential service customer from service events coordinates involved submitting the X, Y coordinates to a reverse geocoding service which would return a suggested address of the event. This process failed to take into consideration the offset required for coordinates being accurately associated with the event (e.g., the arm motion or other service event), and produced inaccurate results based on the RCV being in the street. The implementations described herein significantly increase the accuracy of determining which customer was serviced by associating the event with the actual service parcel, to enable a determination of which automated RCV customers were serviced and which customers were not serviced.

Figure 2C:
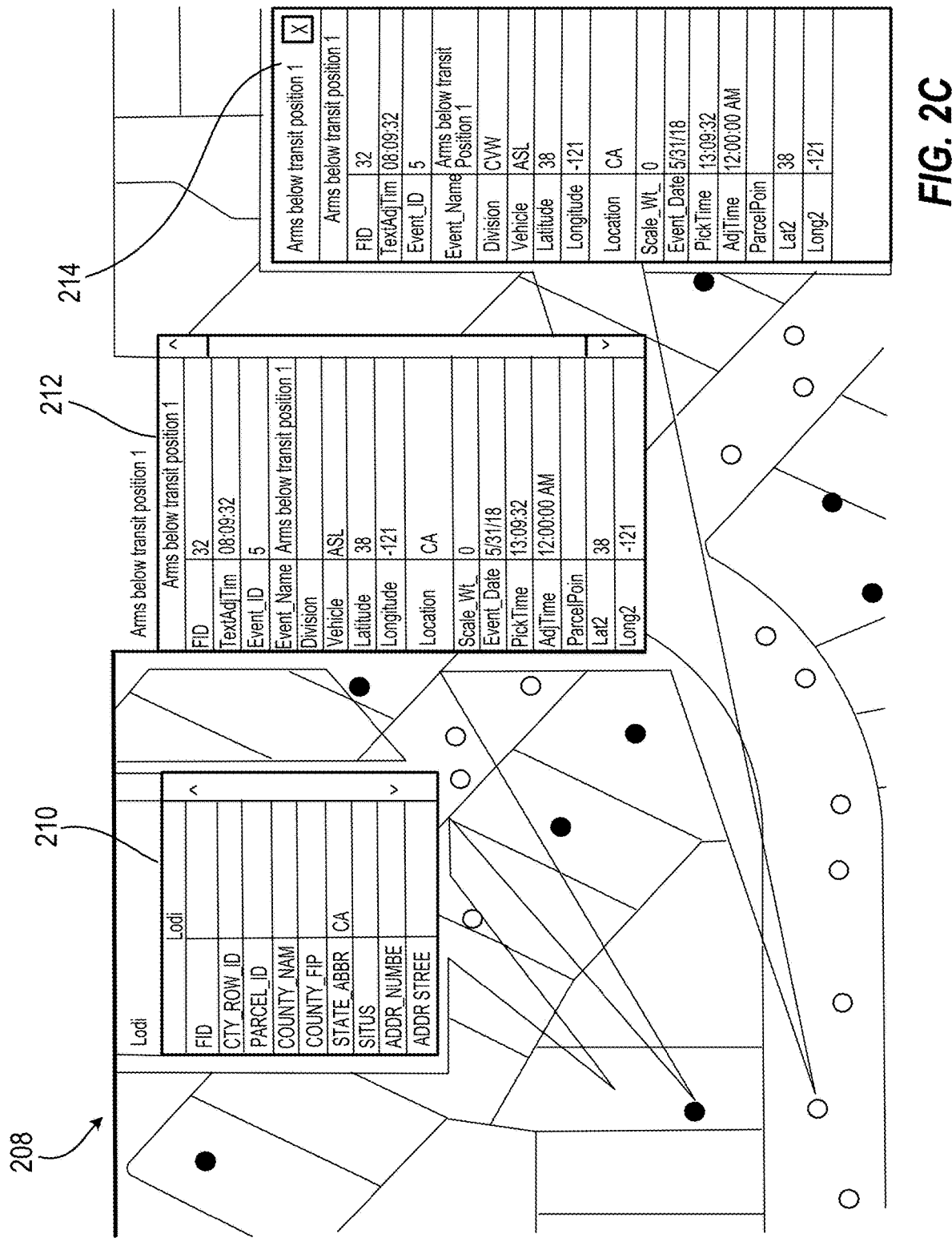
FIG. 2C depicts an example user interface, according to implementations of the present disclosure.

FIG. 2C depicts an example user interface (UI) 208, according to implementations of the present disclosure. For example, the UI 208 can be presented on the output device(s) 136. As shown in this example, the UI 208 can present a map of an area with various refuse pickups. In this example, element 208 displays parcel information for a particular parcel, and elements 212 and 214 display information for a particular container collection event. The unadjusted location information for a collection event may be presented in element 214, and the adjusted location information may be presented in element 212, where the location information is adjusted to bring the coordinates into the boundaries of a parcel that is proximal to the handled container. The adjusted location of 212 can be correlated with the parcel information of 210, to determine the customer associated with the handled container (e.g., the customer who owns, leases, or otherwise occupies the parcel of 210).

Figure 3:
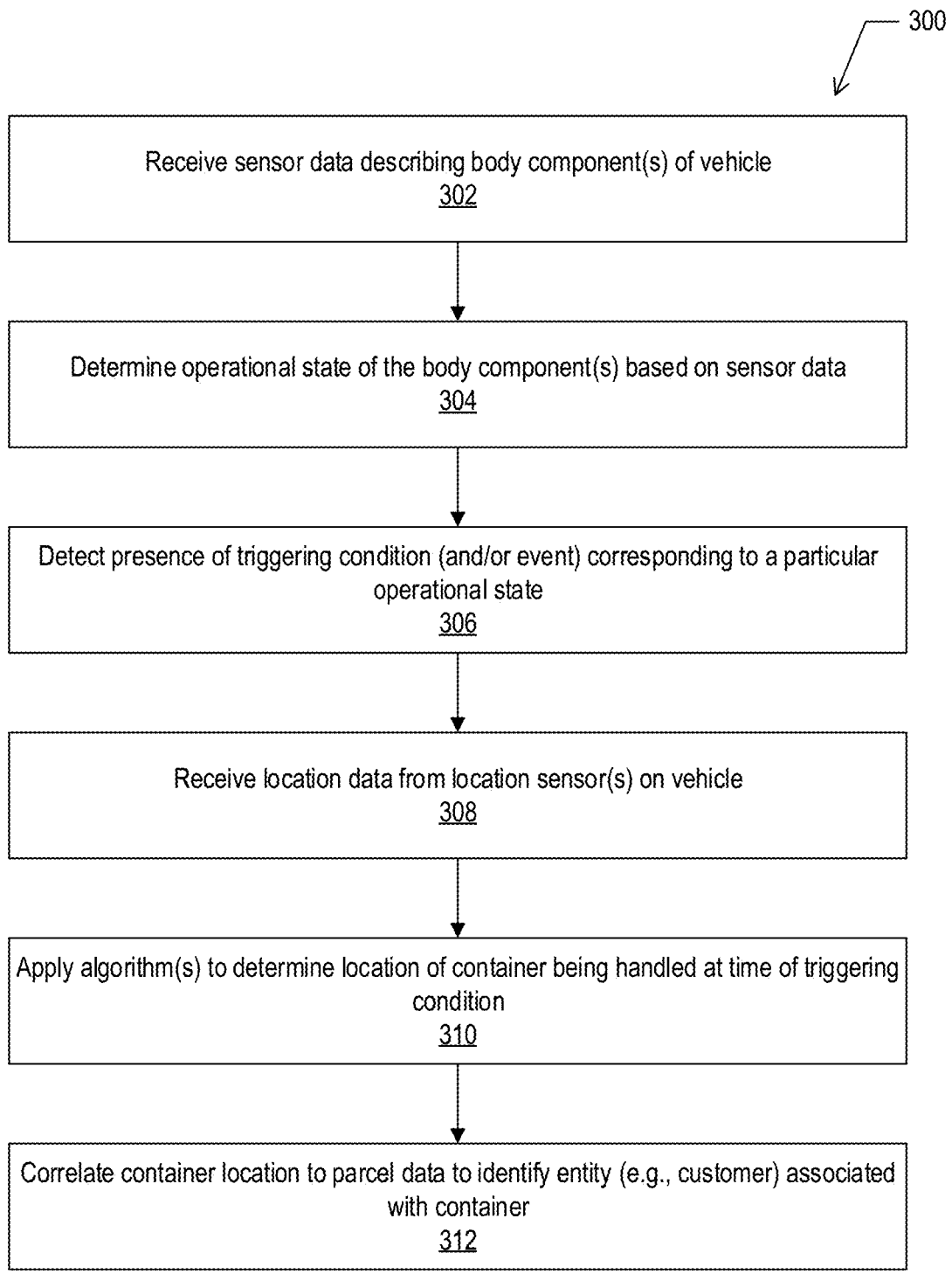
FIG. 3 depicts a flow diagram of an example container identification process, according to implementations of the present disclosure.

FIG. 3 depicts a flow diagram of an example container identification process, according to implementations of the present disclosure. Operations of the process can be performed by one or more of the analysis module(s) 122 and/or other software module(s) executing on the onboard computing device 112, the analysis computing device(s) 120, and/or elsewhere.

Sensor data is received (302), and the sensor data is analyzed to determine (304) an operational state and/or position of one or more body components of the RCV. The presence of a triggering condition is detected (306) based at least partly on a particular operational state of the body component(s), such as the position of a lift arm at a particular point in its cycle to empty a container, a state of a grabber that is grabbing a container, and/or the opening of a hopper lid to receive emptied refuse into the hopper. As described above, the triggering condition can also be based at least partly on other information, such as the speed and/or deceleration of the RCV prior to handling a container. Location data is received (308), and algorithm(s) can be applied to determine the location of the container being handled at the time of the triggering condition (310). The container location can be correlated (312) with parcel data to identify the entity (e.g., individual customer, business customer, etc.) who is associated with the parcel and therefore associated with the container that was serviced while on or near the parcel. As previously discussed, in some implementations, the correlation information describing one or more customers who have been identified as being associated with one or more containers 130 can be used for billing purposes, such as invoicing. In some examples, the correlation information generated by the process of FIG. 3 is used to provide service verification to the refuse collection service and/or customers of the refuse collection service.

Figure 4:
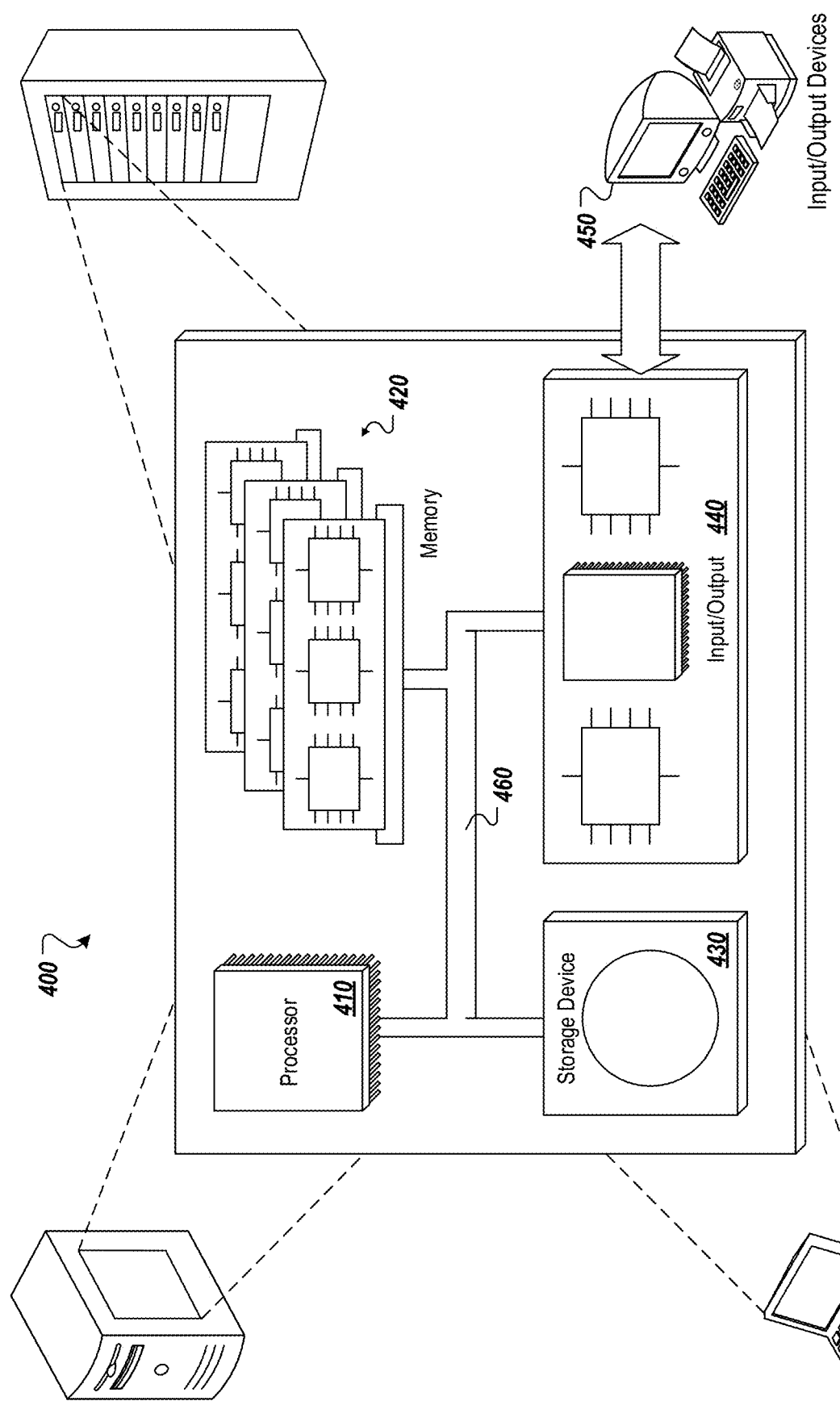
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in one or more of the onboard computing device 112, the analysis computing device(s) 120, the output device(s) 136, and/or other computing device(s) or system(s) described herein. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. For example, the processor(s) 410 may execute instructions for the various software module(s) described herein. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more communication networks using any network protocol.

Computing devices of the system 400 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

The invention claimed is:

1. A computer-implemented method performed by at least one processor, the method comprising:
receiving, by the at least one processor, sensor data generated by a sensor coupled to a refuse collection vehicle (RCV);
analyzing, by the at least one processor, the sensor data to detect a presence of at least one triggering condition;

receiving, by the at least one processor, location data describing a location of a location sensor of the RCV at a time of the at least one triggering condition;

applying, by the at least one processor, an algorithm to the location data to determine a location of a container; and correlating, by the at least one processor, the location of the container to parcel data to identify an entity associated with the container.

2. The computer-implemented method of claim 1, wherein the sensor data indicates an acceleration of the RCV.

3. The computer-implemented method of claim 1, wherein the sensor data indicates a speed of the RCV.

4. The computer-implemented method of claim 1, wherein the sensor data indicates a position or operational state of at least one component of the RCV.

5. The computer-implemented method of claim 1, wherein the sensor data indicates a hydraulic or pneumatic pressure of at least one component of the RCV.

6. The computer-implemented method of claim 1, wherein:
the location data comprises global positioning system (GPS) coordinates; and
applying the algorithm to the location data comprises offsetting the GPS coordinates by a predetermined amount.

7. The computer-implemented method of claim 6, wherein:
offsetting the GPS coordinates by the predetermined amount comprises offsetting the GPS coordinates by a first amount in a first direction and by a second amount in a second direction,
the second direction is perpendicular to the first direction, and
the first direction corresponds to a direction along a long axis of the RCV.

8. The computer-implemented method of claim 1, wherein the parcel data describes land parcels in a geographic region in which the RCV operates.

9. The computer-implemented method of claim 1, wherein the at least one triggering condition indicates that a container is being serviced, was serviced, or is about to be serviced.

10. A computer-implemented method performed by at least one processor, the method comprising:
determining that a rate of acceleration of a refuse collection vehicle (RCV) satisfies criteria for a triggering condition; and
in response to determining that the rate of acceleration of the RCV satisfies the criteria for the triggering condition:
obtaining, by the at least one processor, location data describing a location of a location sensor of the RCV;
applying, by the at least one processor, an algorithm to the location data to determine a location of a container; and
correlating, by the at least one processor, the location of the container to parcel data to identify an entity associated with the container.

11. The computer-implemented method of claim 10, comprising determining the rate of acceleration of the RCV based on sensor data generated by a sensor coupled to the RCV.

12. The computer-implemented method of claim 11, wherein the sensor comprises a global positioning system (GPS) receiver.

13. The computer-implemented method of claim 11, wherein the sensor comprises an accelerometer.

14. The computer-implemented method of claim 11, wherein the sensor comprises a wheel speed sensor.

15. The computer-implemented method of claim 10, wherein the triggering condition indicates that a container is being serviced, was serviced, or is about to be serviced.

16. The computer-implemented method of claim 10, wherein the parcel data describes land parcels in a geographic region in which the RCV operates.

17. The computer-implemented method of claim 10, further comprising transmitting, by the at least one processor, the parcel data for a particular parcel correlated with the location of the container to at least one output device for presentation of the parcel data on the at least one output device.

18. The computer-implemented method of claim 10, further comprising storing, by the at least one processor, the correlation between the location of the container and the parcel data in a storage device communicably coupled to the at least one processor.

19. The computer-implemented method of claim 10, further comprising generating, by the at least one processor, a billing record based at least in part on the correlation between the location of the container and the parcel data.

20. A system comprising one or more processors and one or more storage devices on which are stored instructions that are operable, when executed by the one or more processors, to cause the one or more processors to perform operations comprising:
receiving sensor data generated by a sensor coupled to a refuse collection vehicle (RCV);
analyzing the sensor data to detect a presence of at least one triggering condition;
receiving location data describing a location of a location sensor of the RCV at a time of the at least one triggering condition;
applying an algorithm to the location data to determine a location of a container; and
correlating the location of the container to parcel data to identify an entity associated with the container.

* * * * *